(12) United States Patent
Engelman et al.

(10) Patent No.: US 7,034,668 B2
(45) Date of Patent: Apr. 25, 2006

(54) THREAT LEVEL IDENTIFICATION AND QUANTIFYING SYSTEM

(75) Inventors: Gerald H. Engelman, Plymouth, MI (US); Jonas Ekmark, Olofstorp (SE); Levasseur Tellis, Southfield, MI (US); M. Nabeel Tarabishy, Walled Lake, MI (US); Gyu Myeong Joh, Bloomfield Hills, MI (US); Roger A. Trombley, Jr., Ann Arbor, MI (US); Robert E. Williams, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 142 days.

(21) Appl. No.: 10/694,454

(22) Filed: Oct. 27, 2003

(65) Prior Publication Data

US 2005/0090955 A1 Apr. 28, 2005

(51) Int. Cl.
*B60Q 1/00* (2006.01)

(52) U.S. Cl. ............... 340/435; 340/436; 701/301; 180/275

(58) Field of Classification Search ........ 340/435–437; 701/301, 47, 96; 180/275–280; 342/71
See application file for complete search history.

(56) References Cited

U.S. PATENT DOCUMENTS

| | | | |
|---|---|---|---|
| 5,520,413 A | 5/1996 | Mossi et al. ............... 280/729 |
| 6,085,151 A | 7/2000 | Farmer et al. .............. 701/301 |
| 6,196,575 B1 | 3/2001 | Ellerbrok et al. ........... 280/729 |
| 6,254,121 B1 | 7/2001 | Fowler et al. .............. 280/729 |
| 6,292,753 B1 * | 9/2001 | Sugimoto et al. ........... 701/301 |
| 6,299,202 B1 | 10/2001 | Okada et al. ............... 280/732 |
| 6,420,996 B1 | 7/2002 | Stopczynski et al. ......... 342/70 |
| 6,439,606 B1 | 8/2002 | Okada et al. ............. 280/743.1 |
| 6,454,300 B1 | 9/2002 | Dunkle et al. .............. 280/742 |
| 6,473,681 B1 * | 10/2002 | Eckert et al. ................. 701/70 |
| 6,480,102 B1 | 11/2002 | Miller et al. .................. 340/70 |
| 6,604,042 B1 * | 8/2003 | Maruko et al. ............... 701/96 |
| 6,624,747 B1 * | 9/2003 | Friederich et al. .......... 340/436 |
| 6,721,659 B1 * | 4/2004 | Stopczynski ................ 701/301 |
| 6,825,756 B1 * | 11/2004 | Bai et al. .................... 340/435 |
| 2002/0017774 A1 | 2/2002 | Igawa ..................... 280/728.2 |
| 2002/0099485 A1 | 7/2002 | Browne et al. ............... 701/45 |
| 2002/0113416 A1 | 8/2002 | Uchida ...................... 280/729 |
| 2002/0158456 A1 | 10/2002 | Fischer .................... 280/743.2 |
| 2002/0185845 A1 | 12/2002 | Thomas et al. ............. 280/729 |
| 2002/0196138 A1 | 12/2002 | Kogure et al. .............. 340/442 |
| 2003/0006596 A1 | 1/2003 | Schneider et al. ........ 280/743.1 |
| 2003/0030254 A1 | 2/2003 | Hasebe et al. .............. 280/729 |
| 2003/0034637 A1 | 2/2003 | Wang et al. ................. 280/279 |
| 2003/0060956 A1 | 3/2003 | Rao et al. ..................... 701/45 |
| 2003/0085617 A1 | 5/2003 | Bond III, et al. ........... 303/193 |
| 2003/0236605 A1 * | 12/2003 | Takahashi .................... 701/45 |
| 2004/0122573 A1 * | 6/2004 | Mizutani ..................... 701/45 |

* cited by examiner

*Primary Examiner*—Jeffery Hofsass
*Assistant Examiner*—Jennifer Stone
(74) *Attorney, Agent, or Firm*—Frank A. MacKenzie

(57) ABSTRACT

Methods of performing threat assessment of objects for a vehicle include detecting an object. Kinematics of the vehicle and of the object are determined. A brake threat number and a steering threat number are determined in response to the kinematics of the vehicle and the object. The threat posed by the object is determined in response to the brake threat number and the steering threat number.

20 Claims, 3 Drawing Sheets

THREAT LEVEL IDENTIFICATION AND QUANTIFYING SYSTEM

TECHNICAL FIELD

The present invention relates to vehicle sensing systems. More particularly, the present invention relates to a system and method of identifying and quantifying threat of objects within a host vehicle operating environment.

BACKGROUND OF THE INVENTION

Various sensing systems currently exist for performing collision warning and countermeasure system operations, such as detection, classification, tracking, and relative distance and velocity estimation of objects within a close proximity of a host vehicle.

Collision warning and countermeasure system operations include providing a vehicle operator knowledge and awareness of vehicles and objects that are within a close proximity of the host vehicle to prevent colliding with those objects. The countermeasure systems exist in various passive and active forms. Some countermeasure systems are used to aid in prevention of a collision, others are used to aid in the prevention of injury to a vehicle operator.

Certain collision warning and countermeasure systems are able to sense an object within close proximity of the host vehicle and warn the host vehicle operator, such that the operator can take precautionary steps to prevent a collision or injury. Other collision warning and countermeasure systems activate passive or active countermeasures. Passive countermeasures may, for example, include the activation of airbags or load limiting seatbelts. An example active countermeasure is the activation of brake control, whereby, the system itself aids in preventing a collision or injury.

Active safety technologies depend on the ability of the sensor systems to identify potential objects in the path of the host vehicle and to provide a threat assessment so that appropriate actions may be performed. A threat assessment system typically performs tasks, such as path prediction, object detection, quantification of threat posed by the detected objects, and selection of the objects that are of a concern or that pose a significant threat.

The success of the action in preventing a collision or injury to a vehicle occupant is related to the proper functioning of each task of the threat assessment system. In particular, path prediction and object threat assessment are key elements in that success. Path prediction has been accomplished using various methods, such as methods that use a Kalman filter or that assume that the travel path of an object is in the shape of an arc. The radius of the arc is determined in response to the relative yaw rate and speed of the objects relative to the host vehicle.

Object threat assessment may be affected by several different factors including, relative deceleration levels, range, range rate, speed, and position of the objects. Object threat assessment may also be affected by whether an object is a stationary object or a moving object, size of the object, traffic scenario, road conditions, driver experience, risk aversion and mood, and weather conditions.

To obtain information regarding all of the above-mentioned factors that can affect object threat assessment many sensors are needed and a large amount of information is gathered that needs to be processed. Thus, such a threat assessment system that is capable of obtaining the stated information is complex, costly, and infeasible for mass production. Also, gathering and processing of the mentioned information is time consuming and can negatively affect response time available to avoid a collision. As known in the art, time is of the essence in preventing a collision.

Thus, there exists a need for an improved threat assessment system that is accurate and minimizes the amount of information to be processed to avoid a collision and the amount processing time involved therein.

SUMMARY OF THE INVENTION

The present invention provides a system and methods of performing threat assessment of objects for a vehicle. The methods include detecting an object. Kinematics of the vehicle and of the object are determined. A brake threat number and a steering threat number are determined in response to the kinematics of the vehicle and the object. Threat of the object is determined in response to the brake threat number and the steering threat number.

The embodiments of the present invention provide several advantages. One such advantage is the provision of an efficient technique for performing threat assessment through use of braking and steering parameters. The present invention determines threat posed by a particular host vehicle environment and quantifies that threat using braking and steering parameters.

Another advantage provided by an embodiment of the present invention is the provision of threat assessment for both straight and curved vehicle traveling paths utilizing the above-mentioned parameters. In so doing, the stated embodiment simplifies threat assessment for various road curvatures.

Furthermore, as a result of the above-stated advantages, embodiments of the present invention increases system and occupant available reaction time, which allows for increased time to provide warning signals and perform passive or active countermeasures. Increased reaction time decreases chance of a collision or injury to a vehicle occupant.

The present invention itself, together with attendant advantages, will be best understood by reference to the following detailed description, taken in conjunction with the accompanying figures.

BRIEF DESCRIPTION OF THE DRAWINGS

For a more complete understanding of this invention reference should now be made to embodiments illustrated in greater detail in the accompanying figures and described below by way of examples of the invention wherein.

DETAILED DESCRIPTION

Figure 1:
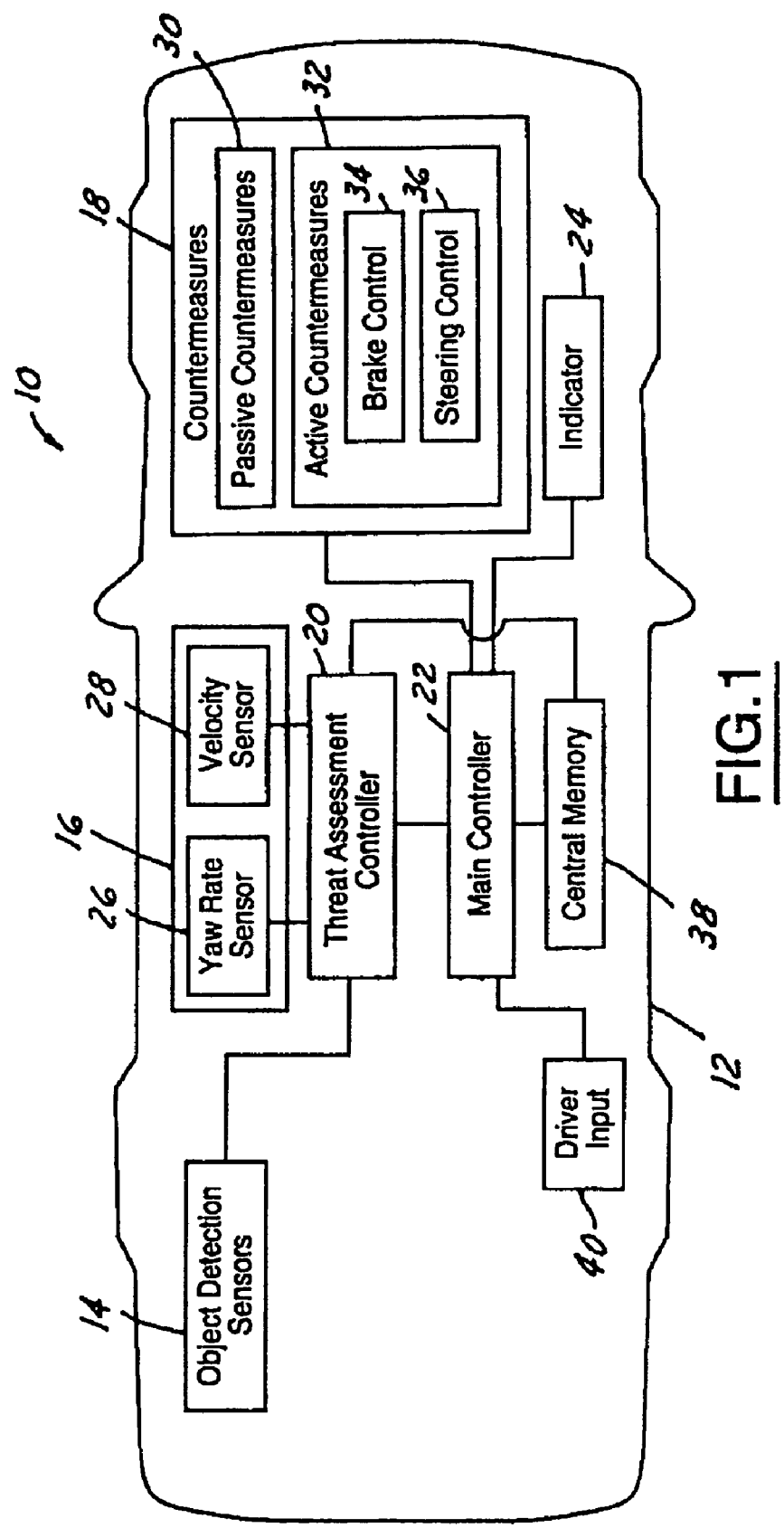
FIG. 1 is a block diagrammatic view of a threat assessment system for a vehicle in accordance with an embodiment of the present invention.

In the following figures the same reference numerals will be used to refer to the same components. The present invention may be adapted and applied to various sensing systems including: collision warning systems, collision avoidance systems, parking-aid systems, reversing-aid systems, passive countermeasure systems, adaptive cruise control systems, lane departure systems, lane-keeping systems, or other systems known in the art that perform threat assessment of detected objects within a vehicle environment.

In the following description, various operating parameters and components are described for multiple constructed embodiments. These specific parameters and components are included as examples and are not meant to be limiting.

Additionally, in the following description, the term "performing" may include activating, deploying, initiating, powering, and other terms known in the art that may describe the manner in which a countermeasure or a comfort and convenience feature is operated.

As well, in the following description, various countermeasures are discussed. The countermeasures may be reversible or irreversible. Reversible countermeasures refer to countermeasures that may be reset to their original form or used repeatedly without a significant amount of functional deficiency, which may be determined by a system designer. Irreversible countermeasures refer to countermeasures, such as airbags that, once deployed, are not reusable.

Furthermore, a countermeasure signal may include information pertaining to the above-stated reversible and irreversible countermeasures or may include other information, such as collision warning information, and parking-aid or reversing-aid countermeasure information. For example, the countermeasure signal may contain object detection information, which may be used to indicate to a vehicle operator the presence or close proximity of a detected object.

In addition, the term "object" may refer to any animate or inanimate object. An object may be a vehicle, a pedestrian, a lane marker, a road sign, a roadway lane designating line, a vehicle occupant, or other object known in the art.

Referring now to FIG. 1, a block diagrammatic view of a threat assessment system 10 for a vehicle 12 in accordance with an embodiment of the present invention is shown. The assessment system 10 includes object detection sensors 14, vehicle status sensors 16, countermeasures 18, and a threat assessment controller 20. The assessment controller 20 in response to relative status of detected objects, with respect to the vehicle 12, determines threat of each object. In determining the threat of each object the assessment controller 20 determines a brake threat number (BTN) and a steering threat number (STN), which are described in further detail below. A main controller 22 is coupled to the assessment controller 20 and determines whether to warn a vehicle driver or occupant of a potential collision, via an indicator 24, or to perform a countermeasure 18 in response to the determined threat of each object.

The object detection sensors 14 may be of various types and styles including vision-based, radar, lidar, ultrasonic, active infrared, passive infrared, telematic, motion, or other object detection sensor known in the art. A vision-based sensor may be a camera, a charged-coupled device, an infrared detector, a series of photodiodes, or other vision sensor known in the art. The object detection sensors 14 may perform not only object detection, but also path prediction, target selection, target classification, as well as other known sensor tasks. The object detection sensors 14 may scan an environment and determine curvature of a road or may determine position, velocity, and acceleration of objects relative to the vehicle 12. The object detection sensors 14 may be distributed to various locations throughout the vehicle 12.

The vehicle status sensors 16 determine current vehicle status. The vehicle status sensors 16 may include a yaw rate sensor 26, a velocity sensor 28, and other vehicle status sensors known in the art, such as a transmission gear sensor, a throttle sensor, a brake sensor, and a steering column position sensor (which are not shown).

The countermeasures 18 may be passive countermeasures 30 or active countermeasures 32 and control thereof may be contained within the controller 22. The passive countermeasures 30 may include internal air bag control, seatbelt control, knee bolster control, head restraint control, load limiting pedal control, load limiting steering control, pretensioner control, external air bag control, pedestrian protection control, and other passive countermeasures known in the art.

The active countermeasures 32 may include brake control 34 and steering control 36, as shown, as well as throttle control, suspension control, transmission control, and other vehicle control systems. The main controller 22 may signal the vehicle operator via the indicator 24 of an impending potential collision so that the vehicle operator may actively perform a precautionary action, such as applying the brakes or steering to prevent a collision.

The assessment controller 20 and the main controller 22 may be microprocessor based such as a computer having a central processing unit, memory (RAM and/or ROM), and associated input and output buses. The controllers 20 and 22 may be application-specific integrated circuits or may be formed of other logic devices known in the art. The controllers 20 and 22 may be a portion of a collision mitigation by braking module, a central vehicle main control unit, an interactive vehicle dynamics module, a restraints control module, a main safety controller, or may be stand-alone controllers as shown. The controllers 20 and 22 may each have associated memories, may share a central memory 38, as shown, or some combination thereof.

The main controller 22 may perform various different sensing system operations including adaptive cruise control, lane-keeping control, lane-departure control, window clearing control, collision avoidance control, countermeasure control, or other sensing system operations known in the art. The operations may be performed sequentially or simultaneously. The main controller 22 may have a driver input 40, by which the controller 22 may perform path prediction as well as other tasks known in the art.

The main controller 22 determines which of the sensing system operations to perform. The main controller 22 while performing one or more of the sensing system operations may determine whether to perform one or more of the countermeasures 18 and indicate to the vehicle operator various object and vehicle status information. Depending upon relative positions, velocities, and accelerations of the detected objects, the main controller 22 may also determine whether to indicate to the vehicle operator of a potential collision or may perform a countermeasure 18, as needed, so as to prevent a collision, mitigate a potential injury, or prevent the vehicle 12 from traveling outside a current lane of travel.

The indicator 24 is used to signal or indicate a safety system signal, which may include a warning signal, a collision-warning signal, a countermeasure signal, or an object identification signal in response to the object detection signals. The indicator 24 may include a video system, an audio system, an LED, a light, a global positioning system, a heads-up display, a headlight, a taillight, a display system, a telematic system, or other indicator known in the art. The indicator 24 may supply warning signals, collision-related information, lane departure and lane-keeping information, external-warning signals to objects or pedestrians located outside of the vehicle 12, or other pre and post collision information.

Figure 2:
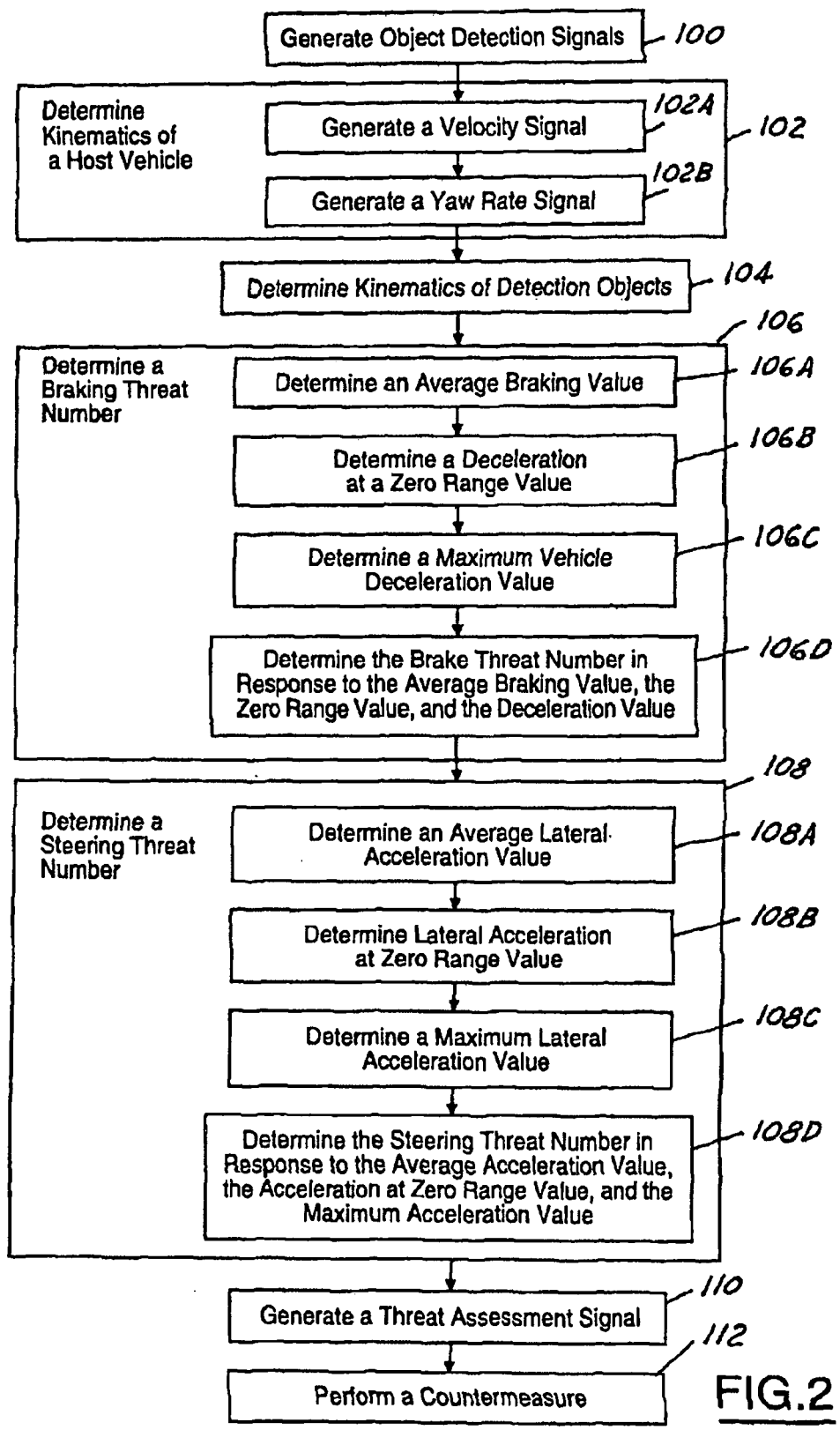
FIG. 2 is a logic flow diagram illustrating a method of performing threat assessment within a vehicle in accordance with an embodiment of the present invention.

Referring now to FIG. 2, a logic flow diagram illustrating a method of performing threat assessment within the vehicle 12 in accordance with an embodiment of the present invention is shown.

In step 100, the object detection sensors 14 generate multiple object detection signals in response to objects within a close proximity of the vehicle 12. The object detection signals may be continuously generated to inform the assessment controller 20 of object status relative to the vehicle 12. The object detection signals may be generated sequentially or simultaneously.

In step 102, the status sensors 16 determine kinematics of the vehicle 12. In step 102A, the velocity sensor 28 generates a velocity signal indicative of speed and direction of travel of the vehicle 12. As such, the assessment controller 20 determines traveling path of the vehicle 12 in response to the velocity signal. In step 102B, the yaw rate sensor 26 generates a yaw rate signal indicative of yaw rate experienced by the vehicle 12. The assessment controller 20 determines road curvature in response to the yaw rate signal.

In step 104, the object detection sensors 14 or the assessment controller 20 determine kinematics of the detected objects relative to the vehicle 12 in response to the object detection signals. The object detection sensors 14 or the assessment controller 20 may determine position, path, velocity, and acceleration of the objects relative to the vehicle 12, using techniques known in the art.

In step 106, the assessment controller 20 determines a BTN, represented by equation 1, in response to the kinematics of the vehicle 12 and the kinematics of the detected objects.

$$BTN = \frac{\ddot{x}_{zero} - \ddot{x}_{avg}}{\ddot{x}_{max} - \ddot{x}_{avg}} \quad (1)$$

As per equation 1, to determine BTN an average braking value $\ddot{x}_{avg}$ is subtracted from a deceleration at zero range value $\ddot{x}_{zero}$ and then divided by the result of a maximum vehicle deceleration value $\ddot{x}_{max}$ minus the average braking value $\ddot{x}_{avg}$. The average braking value $\ddot{x}_{avg}$, the zero range value $\ddot{x}_{zero}$, and the maximum deceleration value $\ddot{x}_{max}$ may be in the form of single values or may be in the form of distributions having one or a series of values. The average braking value $\ddot{x}_{avg}$, the zero range value $\ddot{x}_{zero}$, and the maximum deceleration value $\ddot{x}_{max}$ may also be stored in the memory 38. The expression for BTN may be simplified to remove the average braking value $\ddot{x}_{avg}$, as is represented by equation 2.

$$BTN = \frac{\ddot{x}_{zero}}{\ddot{x}_{max}} \quad (2)$$

Equations 1 and 2 are example linear interpolations that may be used to determine the BTN; other linear and non-linear interpolations may be used.

In step 106A, the average braking value $\ddot{x}_{avg}$ is determined. The average braking value $\ddot{x}_{avg}$ represents average braking pressure or pressures during normal operating situations. Normal braking by a driver is assumed to represent a small or no threat situation. The average braking value $\ddot{x}_{avg}$ may be determined and adjusted in response to normal braking by an individual driver. The average braking value $\ddot{x}_{avg}$ may be a predetermined value.

In step 106B, the zero range value $\ddot{x}_{zero}$ is determined. The zero range value $\ddot{x}_{zero}$ represents the amount of braking pressure that is to be applied in order to stop the vehicle 12 at zero range, such that there is little to no space between the vehicle 12 and the object of concern. The zero range value $\ddot{x}_{zero}$ is determined in response to the vehicle kinematics and the kinematics of the detected objects. The deceleration at zero range value $\ddot{x}_{zero}$ is determined to prevent a collision between the vehicle 12 and the detected objects. A safety margin may be added to the zero range value $\ddot{x}_{zero}$ to increase distance between an object and the vehicle 12.

Figure 3:
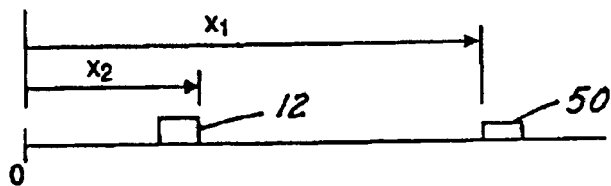
FIG. 3 is a position diagram of an object relative to a host vehicle in accordance with an embodiment of the present invention.

Referring also to FIG. 3, a position diagram of an object 50 relative to the vehicle 12 in accordance with an embodiment of the present invention is shown. Equations 3–5 represent position $x_1$, velocity $\dot{x}_1$, and acceleration $\ddot{x}_1$ of the detected object 50 for a straight road or path situation where t is time, $x_{01}$ is an initial position of the object 50, and $\alpha$ is a constant.

$$x_1 = \alpha \frac{t^2}{2} + \dot{x}_{01} t + x_{01} \quad (3)$$

$$\dot{x}_1 = \alpha t + \dot{x}_{01} \quad (4)$$

$$\ddot{x}_1 = \alpha \quad (5)$$

Equations 6–8 represent position $x_2$, velocity $\dot{x}_2$, and acceleration $\ddot{x}_2$ of the vehicle 12 where $x_{02}$ is an initial position of the vehicle 12 and $\beta$ is a constant.

$$x_2 = \beta \frac{t^2}{2} + \dot{x}_{02} t + x_{02} \quad (6)$$

$$\dot{x}_2 \beta t + \dot{x}_{02} \quad (7)$$

$$\ddot{x}_2 = \beta \quad (8)$$

Assume at time zero that the initial position $x_{02}$ to be at an origin or equal to zero and the initial position $x_{01}$ to be at a range R from the origin. To avoid a collision between the vehicle 12 and the object 50 it is desired that at least one of the following expressions 9–11 are met.

$$x_2 \leq x_1 \quad (9)$$

$$R \geq 0 \quad (10)$$

$$R = \ddot{R}_0 \frac{t^2}{2} + \dot{R}_0 t + R_0 \geq 0 \quad (11)$$

$R_0$, $\dot{R}_0$, and $\ddot{R}_0$ represent relative position or range, relative velocity, and relative acceleration, respectively, of the object 50 with respect to the vehicle 12. The sign of range R depends on sign of relative acceleration $\ddot{R}$. When relative acceleration $\ddot{R}$ is greater than zero then to assure that there is no solution for expression 11, such that range R is positive, expression 12 is met.

$$\dot{R}_0^2 - 2R_0\ddot{R}^* < 0 \quad (12)$$

A critical point or a point of collision occurs when equation 13 is satisfied.

$$\dot{R}_0 - 2R_0\ddot{R}^* = 0 \quad (13)$$

At the point of collision critical relative acceleration $\ddot{R}^*$ is represented by equation 14.

$$\ddot{R}^* = \frac{\dot{R}_0^2}{2R_0} \quad (14)$$

Therefore, critical vehicle deceleration is represented by equation 15.

$$\ddot{x}_2^* \leq \ddot{x}_1 - \ddot{R}^* \quad (15)$$

Equations 16–17, representing expressions for the deceleration at zero range value $\ddot{x}_{zero}$, may be derived from equations 12–15.

$$\ddot{x}_{zero} \leq \ddot{x}_1 - \ddot{R}^* - \ddot{x}_2 \quad (16)$$

$$\ddot{x}_{zero} \leq \ddot{R} - \ddot{R}^* = \ddot{R} - \frac{\dot{R}_0^2}{2R_0} \quad (17)$$

Figure 4:
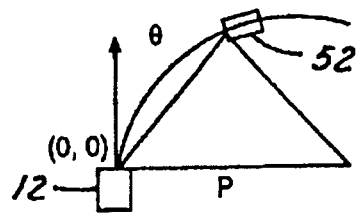
FIG. 4 is a curved road representation diagram for an object relative to a host vehicle in accordance with an embodiment of the present invention.

Referring also to FIG. 4, a curved road representation diagram for an object 52 relative to the vehicle 12 in accordance with an embodiment of the present invention is shown. For a curved road or path situation vehicle velocity $v_h$ and object velocity $v_t$ may be determined using equations 18–20 where s is arc length, $\dot{R}$ is range rate, $\omega_h$ is yaw rate of the vehicle, $\rho$ is radius of curvature, and $\theta$ is azimuth angle of the object 52 relative to the vehicle 12.

$$s = R + \frac{R^3}{8\rho^2} \approx R \quad (18)$$

$$\rho = \frac{v_h}{\omega_h} \quad (19)$$

$$v_t = v_h + \frac{\dot{R}}{\cos(\theta)} \approx v_h + \dot{R} \quad (20)$$

A straight-line comparison or approximation may be used in a curved road situation.

In step 106C, the maximum deceleration value $\ddot{x}_{max}$ is determined. The maximum deceleration value $\ddot{x}_{max}$ represents a maximum threat situation where a maximum braking pressure or profile is applied. The maximum deceleration value $\ddot{x}_{max}$ may be a predetermined value.

In step 106D, the above-determined values for the average braking value $\ddot{x}_{avg}$, the zero range value $\ddot{x}_{zero}$, and the maximum deceleration value $\ddot{x}_{max}$ are entered into equations 1 or 2 to determine the BTN.

In step 108, the assessment controller 20 determines a STN, represented by equation 21, in response to the kinematics of the vehicle 12 and the kinematics of the detected objects.

$$STN = \frac{\ddot{y}_{zero} - \ddot{y}_{avg}}{\ddot{y}_{max} - \ddot{y}_{avg}} \quad (21)$$

An average lateral acceleration value $\ddot{y}_{avg}$ is subtracted from a lateral acceleration at zero range value $\ddot{y}_{zero}$ and then divided by the result of a maximum lateral acceleration value $\ddot{y}_{max}$ minus the average acceleration value $\ddot{y}_{avg}$. This expression for STN may also be simplified to remove the average acceleration value $\ddot{y}_{avg}$, as is represented by equation 22.

$$STN = \frac{\ddot{y}_{zero}}{\ddot{y}_{max}} \quad (22)$$

Equations 21 and 22 are example linear interpolations that may be used to determine the STN; other linear and non-linear interpolations may be used.

As with the braking values described above, the average acceleration value $\ddot{y}_{avg}$ is determined in response to normal driver steering in normal operating conditions and represents a small or no threat situation. The maximum acceleration value $\ddot{y}_{max}$ represents a maximum threat situation where a maximum amount of lateral acceleration is performed. The average acceleration value $\ddot{y}_{avg}$, the acceleration at zero range value $\ddot{y}_{zero}$, and the maximum acceleration value $\ddot{y}_{max}$ may be in the form of single values or may be in the form of distributions having one or a series of values. The average acceleration value $\ddot{y}_{avg}$, the acceleration at zero range value $\ddot{y}_{zero}$, and the maximum acceleration value $\ddot{y}_{max}$ may also be stored in the memory 38.

In step 108A, the average acceleration value $\ddot{y}_{avg}$ determined. The average acceleration value $\ddot{y}_{avg}$ represents average steering during normal operating situations. Normal steering by a driver is assumed to represent a small or no threat situation. The average acceleration value $\ddot{y}_{avg}$ may be determined and adjusted in response to normal steering by an individual driver. The average acceleration value $\ddot{y}_{avg}$ may be a predetermined value.

In step 108B, the acceleration at zero range value $\ddot{y}_{zero}$ is determined. The acceleration at zero range value $\ddot{y}_{zero}$ represents the amount of lateral acceleration the vehicle 12 is to exhibit in order to avoid a collision with an object of concern. At longer ranges, steering may be more efficient in preventing a collision than braking. To determine lateral acceleration to avoid an object, the action of performing a lane change may be assumed to be at a constant acceleration rate.

Figure 5:
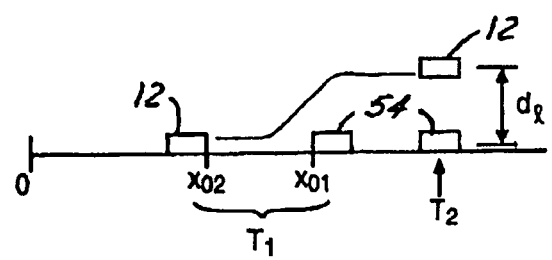
FIG. 5 is a steering maneuver diagram of a host vehicle maneuvering to avoid an object in accordance with an embodiment of the present invention.

Referring also to FIG. 5, a steering maneuver diagram of the vehicle 12 maneuvering to avoid an object 54 in accordance with an embodiment of the present invention is shown. The vehicle 12 and the object 54 are shown for a first time period $T_1$ and for a second time period $T_2$. The time period $T_1$ corresponds with when the vehicle 12 detects the object 54 and the time period $T_2$ corresponds with when the vehicle 12 has maneuvered to an adjacent lane and is aside the object 54.

Lateral distance $d_l$ and velocity $v_l$ of the vehicle 12 to maneuver around the object 54 are represented by equations 23 and 24, where lateral acceleration $a_l$ is a constant and time $t_m$ represents the maneuver time for a straight road or path situation.

$$d_l = \frac{a_l t_m^2}{2} \tag{23}$$

$$v_l = a_l t_m \tag{24}$$

Equation 25 is derived from equation 23 to determine time $t_m$.

$$t_m = \sqrt{\frac{2 d_l}{a_l}} \tag{25}$$

Three main different situations can occur, when relative acceleration $\ddot{R}$ is greater than, equal to, or less than zero. When relative acceleration $\ddot{R}$ is equal to zero and relative velocity $\dot{R}$ is less than zero equations 26 and 27, representing time until a potential collision occurs $t_c$ and the acceleration at zero range $\ddot{y}_{zero}$, are satisfied. The maneuver time $t_m$ is approximately equal to the time until a potential collision occurs $t_c$.

$$t_c = \frac{R}{\dot{R}} \tag{26}$$

$$\ddot{y}_{zero} = \frac{2d}{t^2} \tag{27}$$

When relative acceleration $\ddot{R}$ equals zero and relative velocity $\dot{R}$ is greater than or equal to zero then there is no threat.

When relative acceleration $\ddot{R}$ is greater than zero and relative velocity $\dot{R}$ is less than zero then equations 28 and 29, representing time $t$ and the acceleration at zero range $\ddot{y}_{zero}$, are satisfied.

$$t = \frac{-\dot{R} - \sqrt{\dot{R}^2 - 2R\ddot{R}}}{\ddot{R}} \tag{28}$$

$$\ddot{y}_{zero} = \frac{2d}{t^2} \tag{29}$$

When relative acceleration $\ddot{R}$ is greater than zero and relative velocity $\dot{R}$ is greater than or equal to zero there is no threat.

When relative acceleration $\ddot{R}$ is less than zero equations 30 and 31, representing time $t$ and the acceleration at zero range $\ddot{y}_{zero}$, are satisfied.

$$t = \frac{-\dot{R} - \sqrt{\dot{R}^2 - 2R\ddot{R}}}{\ddot{R}} \tag{30}$$

$$\ddot{y}_{zero} = \frac{2d}{t^2} \tag{31}$$

Steering on a curved road is similar to that of driving on a straight road, however, the lane change maneuver is different whether the vehicle 12 is changing lane to the inside or to the outside of the curved road. Thus, time $t$ and lateral distance $d_l$ are different for changing lanes to the inside or the outside of a curved road.

In step 108C, the maximum acceleration value $\ddot{y}_{max}$ is determined. The maximum acceleration value $\ddot{y}_{max}$ represents a maximum threat situation where a maximum amount of steering or yaw rate is applied and exhibited by the vehicle 12. The maximum acceleration value $\ddot{y}_{max}$ may be a predetermined value.

In step 108D, the STN is determined using the above-determined values for the average acceleration value $\ddot{y}_{avg}$, the acceleration at zero range value $\ddot{y}_{zero}$, and the maximum acceleration value $\ddot{y}_{max}$.

In step 110, the assessment controller 20 generates a threat assessment signal in response to the BTN and the STN.

In step 112, the main controller 22 determines threat of the detected objects in response to the threat assessment signal and determines whether to perform one or more of the countermeasures 18. Upon determining to perform a countermeasure the main controller 22 generates a safety system signal, which may contain various countermeasure related signals. The main controller 22 as part of a countermeasure may generate a warning signal and communicate the warning signal to vehicle occupants via the indicator 24.

As part of performing an active countermeasure, the main controller 22 may reduce traveling speed of the vehicle 12 when the BTN, the STN, or a combination thereof is above a predetermined value. The main controller 22 may also control steering of the vehicle 12 when the STN, the BTN, or a combination thereof is above a predetermined value.

Figure 6A:
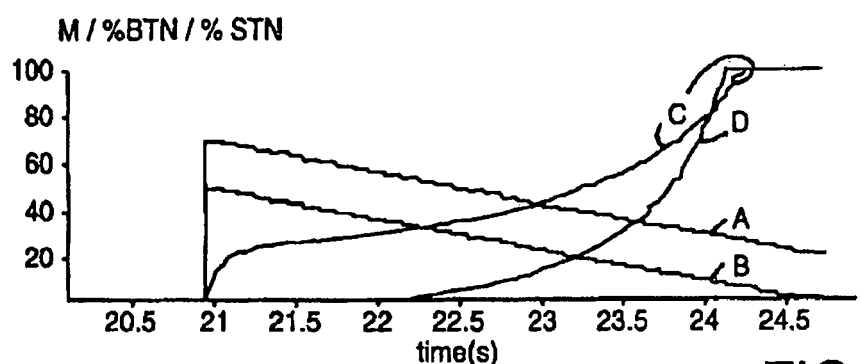
FIG. 6A is a plot of object relative range to a host vehicle, brake threat number, and steering threat number versus time in accordance with an embodiment of the present invention.
Figure 6B:
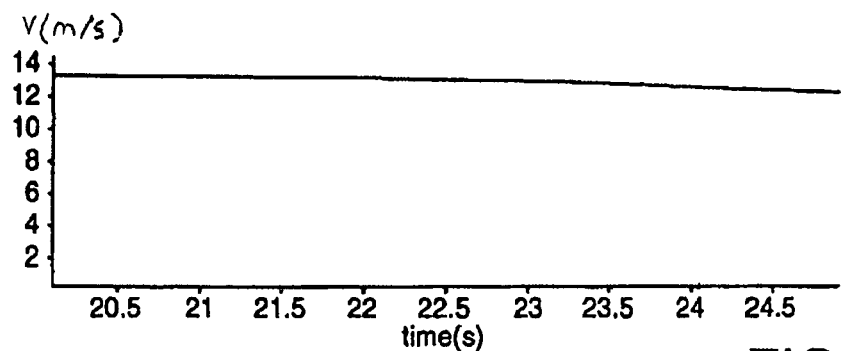
FIG. 6B is a plot of velocity versus time of the host vehicle of FIG. 6A in accordance with an embodiment of the present invention.

Referring now to FIGS. 6A and 6B, a plot of object relative range to the vehicle 12, BTN versus time, STN versus time, and a corresponding plot of velocity versus time of the vehicle 12 in accordance with an embodiment of the present invention are shown. The BTN and the STN are in percentages. When the BTN reaches 100% a collision cannot be avoided simply by braking. When the STN reaches 100% a collision cannot be avoided simply by steering the vehicle 12. Curve A represents range of an object relative to the vehicle 12. Curve B represents a simulated range of the object relative to the vehicle 12, which is approximately equal to the range minus 20 m. Curve C represents a corresponding BTN. Curve D represents a corresponding STN. As is seen from curves A–D, as the range between the object and the vehicle 12 decreases the BTN and the STN increase. Also, note that the STN reaches 100% before the BTN. Thus, for this example, although the time difference is small, there is more time to apply the brakes than there is to steer the vehicle 12 to avoid a collision.

The above-described steps are meant to be illustrative examples; the steps may be performed sequentially, synchronously, simultaneously, or in a different order depending upon the application.

The present invention provides a simplified and efficient method of performing threat assessment of objects with respect to a host vehicle. The present invention in response to determining a BTN and a STN determines whether a countermeasure should be performed to avoid a collision and to prevent injury to a vehicle occupant.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method of performing threat assessment within a vehicle comprising:
   detecting at least one object;
   determining kinematics of the vehicle;
   determining kinematics of said at least one object;
   determining a brake threat number, comprising determining an approximate deceleration at zero range value, in response to said vehicle kinematics and said kinematics of said at least one object; and
   determining a threat of said at least one object in response to said brake threat number.

2. A method as in claim 1 further comprising:
   determining a steering treat number in response to said vehicle kinematics and said kinematics of said at least one object; and
   determining a threat of said at least one object in response to said steering threat number.

3. A method as in claim 1 wherein determining kinematics of said vehicle and determining kinematics of said at least one object comprise:
   determining a path of the vehicle; and
   determining a path of said at least one object.

4. A method as in claim 1 wherein determining kinematics of said vehicle and determining kinematics of said at least one object comprise determining relative position, velocity, and acceleration of said at least one object relative to the vehicle.

5. A method as in claim 1 wherein determining kinematics of said vehicle and determining kinematics of said at least one object comprise determining yaw rate of the vehicle.

6. A method as in claim 1 wherein determining said brake threat number comprises:
   determining a maximum vehicle deceleration value.

7. A method as in claim 6 wherein determining said brake threat nunber further comprises dividing said deceleration at zero range value by said maximum vehicle deceleration value.

8. A method as in claim 1 wherein determining said brake threat number comprises determining an average braking value.

9. A method of performing threat assessment within a vehicle comprising:
   detecting at least one object;
   determining kinematics of the vehicle;
   determining kinematics of said at least one object;
   determining a steering threat number in response to said vehicle kinematics and said kinematics of said at least one object; and
   determining a threat of said at least one object in response to said steering threat number.

10. A method as in claim 9 further comprising:
    determining a brake threat number in response to said vehicle kinematics and said kinematics of said at least one object; and
    determining a threat of said at least one object in response to said brake threat number.

11. A method as in claim 9 wherein determining said steering threat number comprises:
    determining a lateral acceleration at zero range value; and
    determining a maximum lateral acceleration value.

12. A method as in claim 11 wherein determining said steering threat number further comprises dividing said lateral acceleration at zero range value by said maximum lateral acceleration value.

13. A method as in claim 9 wherein determining said steering threat number comprises determining an average lateral acceleration value.

14. A threat assessment system for a vehicle comprising:
    at least one object detection sensor generating at least one object detection signal; and
    a controller coupled to said at least one object detection sensor and determining a braking threat number and a steering threat number in response to said at least one object detection signal, said controller determining a threat of said at least one object in response to said braking threat number and said steering threat number.

15. A system as in claim 14 wherein said controller performs at least one countermeasure in response to said braking threat number.

16. A system as in claim 14 wherein said controller reduces traveling speed of the vehicle when said brake threat number is above a predetermined value.

17. A system as in claim 14 wherein said controller reduces traveling speed of the vehicle when said steering threat number is above a predetermined value.

18. A system as in claim 14 wherein said controller adjusts direction of travel of the vehicle when said steering threat number is above a predetermined value.

19. A system as in claim 14 wherein said controller adjusts direction of travel of the vehicle when a brake threat number is above a predetermined value.

20. A system as in claim 14 wherein said controller, in determining a braking threat number and a steering threat number, determines a deceleration at a zero range profile, a maximum vehicle deceleration profile, a lateral acceleration at zero range profile, and a maximum lateral acceleration profile.

* * * * *